United States Patent [19]
Ohyoshi et al.

[11] Patent Number: 6,094,419
[45] Date of Patent: Jul. 25, 2000

[54] TRAFFIC CONTROL METHOD, NETWORK SYSTEM AND FRAME RELAY SWITCH

[75] Inventors: Akitsugu Ohyoshi; Hiroshi Takahashi, both of Kanagawa, Japan

[73] Assignee: Fujitsu Limited, Kanagawa, Japan

[21] Appl. No.: 08/863,500

[22] Filed: Jun. 2, 1997

[30] Foreign Application Priority Data

Oct. 28, 1996 [JP] Japan ................................ 8-285669

[51] Int. Cl.⁷ ............................ H04L 12/26; H04L 12/28
[52] U.S. Cl. ........................ 370/231; 370/253; 370/395
[58] Field of Search .................................. 370/230, 231, 370/232, 233, 234, 235, 236, 252, 253, 395, 397

[56] References Cited

U.S. PATENT DOCUMENTS

| | | | |
|---|---|---|---|
| 5,313,454 | 5/1994 | Bustini et al. | 370/231 |
| 5,444,706 | 8/1995 | Osaki | 370/230 |

FOREIGN PATENT DOCUMENTS

| | | |
|---|---|---|
| 4-207543 | 7/1992 | Japan . |
| 4-257145 | 9/1992 | Japan . |
| 08008932A | 1/1996 | Japan . |
| 08018569A | 1/1996 | Japan . |

*Primary Examiner*—Alpus H. Hsu
*Assistant Examiner*—Afsar M. Qureshi
*Attorney, Agent, or Firm*—Helfgott & Karas, P.C.

[57] ABSTRACT

A traffic control method can prevent that the number of cells transmitted to an ATM network exceeds a maximum transmission rate. When a frame F is transmitted from a frame relay network FR1 to an IWF, a traffic control part included in the frame relay network FR1 measures the transmission data quantity for a measuring time in a DLCI connecting the frame relay network FR1 and the IWF. Successively, the traffic control part detects a traffic restrictive level corresponding to the measured transmission data quantity. Then, the traffic restrictive process corresponding to the restrictive level is performed, and the frame transmission is controlled by the transmitted terminal of the frame F. Thus, it is prevented that the number of cells transmitted to the ATM network exceeds a determined maximum transmission rate.

7 Claims, 15 Drawing Sheets

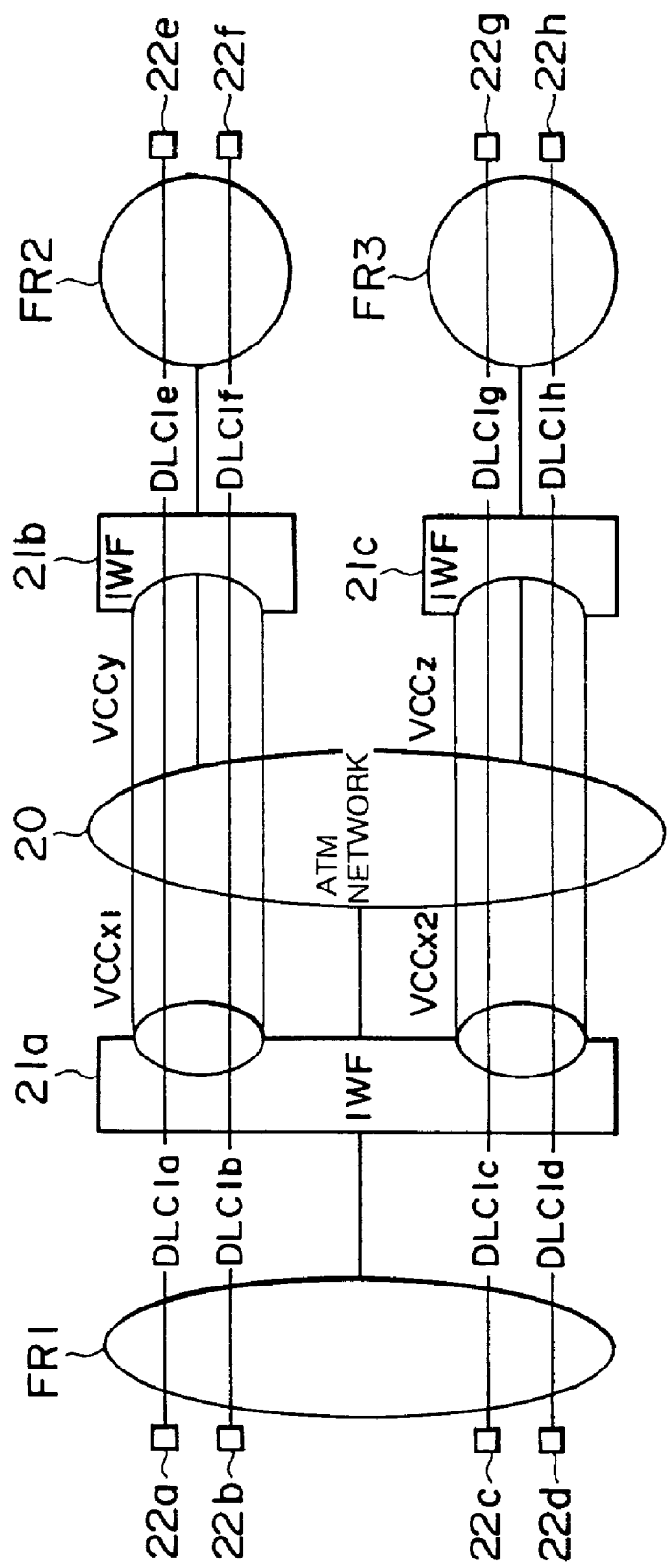

FIG. 10

| | | |
|---|---|---|
| GENERAL CLASS | PROCESS TASK 1 (NON-RESTRICTION) | |
| | PROCESS TASK 2 (FIRST RESTRICTION) | |
| | PROCESS TASK 3 (SECOND RESTRICTION) | |
| | PROCESS TASK 3 (THIRD RESTRICTION) | 59 |
| | PROCESS TASK 4 (FOURTH RESTRICTION) | |
| IMPORTANT CLASS | PROCESS TASK 1 (NON-RESTRICTION) | |
| | PROCESS TASK 1 (FIRST RESTRICTION) | |
| | PROCESS TASK 2 (SECOND RESTRICTION) | 59 |
| | PROCESS TASK 3 (THIRD RESTRICTION) | |
| | PROCESS TASK 4 (FOURTH RESTRICTION) | |
| MOST IMPORTANT CLASS | PROCESS TASK 1 (NON-RESTRICTION) | |
| | PROCESS TASK 1 (FIRST RESTRICTION) | |
| | PROCESS TASK 1 (SECOND RESTRICTION) | 54a |
| | PROCESS TASK 1 (THIRD RESTRICTION) | |
| | PROCESS TASK 4 (FOURTH RESTRICTION) | 59 |
| GENERAL CLASS | PROCESS TASK 1 (NON-RESTRICTION) | |
| | PROCESS TASK 5 (FIRST RESTRICTION) | 59 |
| | PROCESS TASK 5 (SECOND RESTRICTION) | 54b |
| | PROCESS TASK 5 (THIRD RESTRICTION) | |
| | PROCESS TASK 5 (FOURTH RESTRICTION) | |
| IMPORTANT CLASS | PROCESS TASK 1 (NON-RESTRICTION) | |
| | PROCESS TASK 1 (FIRST RESTRICTION) | |
| | PROCESS TASK 5 (SECOND RESTRICTION) | 59 |
| | PROCESS TASK 5 (THIRD RESTRICTION) | |
| | PROCESS TASK 5 (FOURTH RESTRICTION) | |
| MOST IMPORTANT CLASS | PROCESS TASK 1 (NON-RESTRICTION) | |
| | PROCESS TASK 1 (FIRST RESTRICTION) | |
| | PROCESS TASK 1 (SECOND RESTRICTION) | 59 |
| | PROCESS TASK 1 (THIRD RESTRICTION) | |
| | PROCESS TASK 5 (FOURTH RESTRICTION) | |

| RESTRICTIVE LEVEL | TRAFFIC RESTRICTIVE CLASS | GENERAL CLASS | IMPORTANT CLASS | MOST IMPORTANT CLASS |
|---|---|---|---|---|
| NON-RESTRICTION | SD ≦ maxRX t l × n1 | NO RESTRICTION | NO RESTRICTION | NO RESTRICTION |
| FIRST RESTRICTION | maxRX t l × n1 < SD ≦ maxRX t l × n2 | TRANSMITTED FRAME : FECN=1 RECEIVED FRAME : BECN=1 | | |
| SECOND RESTRICTION | maxRX t l × n2 < SD ≦ maxRX t l × n3 | TRANSMITTED FRAME DE=0:FECN=1 DE=1:DISCARD RECEIVED FRAME : BECN=1 | TRANSMITTED FRAME : FECN=1 RECEIVED FRAME : BECN=1 | |
| THIRD RESTRICTION | maxRX t l × n3 < SD ≦ maxRX t l × n4 | TRANSMITTED FRAME DE=0:FECN=1 DE=1:DISCARD RECEIVED FRAME : BECN=1 | TRANSMITTED FRAME DE=0:FECN=1 DE=1:DISCARD RECEIVED FRAME : BECN=1 | |
| FOURTH RESTRICTION | maxRX t l × n4 < SD | TRANSMITTED FRAME : DISCARD RECEIVED FRAME : BECN=1 | TRANSMITTED FRAME : DISCARD RECEIVED FRAME : BECN=1 | TRANSMITTED FRAME : DISCARD RECEIVED FRAME : BECN=1 |

\* SD: TRANSMISSION DATA QUANTITY,

\*\* 0 < n1 < n2 < n3 < n4 ≦ l

\*\*\* "DE=0:FECN=1" INDICATES THAT FECN=1 IS SET FOR FRAME OF DE=0

\*\*\*\* "DE=1:DISCARD" INDICATES THAT FRAME OF DE=1 IS DISCARDED

TRAFFIC CONTROL METHOD, NETWORK SYSTEM AND FRAME RELAY SWITCH

BACKGROUND OF THE INVENTION

1. Field of the Invention

The present invention relates to a network system in which plural frame relay networks are connected to an ATM (Asynchronous Transfer Mode) switch, to a traffic control method in the network system and to a frame relay switch in each of the plural frame relay networks.

2. Description of the Related Art

Recently, the B-ISDN (Broadband Integrated Service Digital Network) is rapidly introduced as the LAN (Local Area Network) is made a high speed and a multimedia. In data communication, as a first step for the next generation, cases increase in that an ATM network is used as a repeater for frame relay networks.

FIG. 16 is a whole structural view of a network system which an ATM network is used as a repeating network for plural frame relay networks. In FIG. 16, frame relay networks 1, 2 are respectively connected with an ATM network 3 through each IWF (InterWork Function) 4 which disassembles a frame into cells. The frame relay networks 1, 2 are also respectively connected with terminals 5, 6 for users in the network system. In the ATM network, a VP (Virtual Path) which plural VCs (Virtual Channel) are put together is set, and communication channels (VCC: Virtual Channel Connection) for respective VCs are set. A maximum transmission rate (PCR: Peak Cell Rate) which cells can be transmitted is also set every VCC. Then, when a number of cells transmitted from the IWF 4 to the ATM network 3 exceeds the PCR set for the ATM network 3, the ATM network 3 discards cells so as to avoid or release congestions in the ATM network 3. When a cell (frame) is discarded in the ATM network 3, no response frame to the discarded cell (frame) is transmitted to the terminals 5, 6. Thus, when the user of terminal 5 or 6 receives no response frame concerning the frame transmitted by the user for a predetermined time, the user determines that no frame reaches a transmitted terminal, and transmits the same frame as said discard cell (frame) again.

The above-described network system, however, has the following problems.

That is, a number of cells transmitted from the IWF 4 to the ATM network 3 exceeds the PCR, whereby cells (transmitting frames) are frequently discarded. Thus, the terminal 5 or 6 which has transmitted the discarded frame (cell) re-transmits the transmitting frames frequently, As the result, there was a possibility in that congestions occur in the frame relay networks FR1, FR2, too.

Further, frames are re-transmitted from the terminals 5, 6 caused by that cells (frames) are discarded in the ATM network 3, whereby processes increase in the frame relay networks FR1, FR2. Thus, there was a possibility in that a response deteriorates between the terminal 5 and the terminal 6 (end to end).

SUMMARY OF THE INVENTION

Accordingly, it is an object of the present invention to solve the above described problems, and to provides a traffic control method, a network system and a frame relay switch, wherein it is possible to prevent a number of cells in an ATM network from exceeding a maximum transmission rate (PCR).

The present invention introduces the following structure to solve the above described problems.

That is, the preset invention relates to a traffic control method in a network system. The network system comprises an ATM (Asynchronous Transfer Mode) network, plural frame relay networks respectively connected to the ATM network through channels and plural terminals respectively connected to the plural frame relay networks through channels. In this traffic control method, a data quantity transmitted through each channel is measured, a traffic restrictive level corresponding to the data quantity which is measured is operated, and a traffic restrictive process corresponding to the traffic restrictive level which is operated is performed (first aspect).

According to the traffic control method in the present invention, for example, when data is transmitted from the frame relay network to the ATM network, a data quantity is measured in the frame relay network connected with the transmitted terminal of the data, the traffic restrict level is operated in accordance with this data quantity, and the traffic restrict process is performed. Thus, the data quantity can be controlled within a desired range.

The data quantity may be measured when the frame relay network transmits a frame or receives a frame.

Any number of steps (levels) may also set as the traffic restrictive level when necessary. The measuring time of the data quantity can be varied suitably, namely, may be fixed or may be varied in accordance with the congestion condition in the network system.

The traffic restrictive process may comprise a process for writing information indicating that a congestion occurs to data transmitted through the each channel (fourth aspect). For example, "1" is set into a FECN (Forward Explicit Notification-bit) stored in a core header of the frame to be data, the transmitted terminal of the frame receives the frame of which the FECN stored in the core header, whereby a congestion control is performed (such as the frame transmission to the frame relay network is controlled or stopped). "1" is set into a BECN (Backward Explicit Notification-bit) stored in a core header of the frame to be data, the transmitted terminal of the frame receives the frame of which the FECN stored in the core header, whereby a congestion control is performed.

The traffic restrictive process may comprise a process for discarding data transmitted through the each channel.(fifth aspect).

The traffic restrictive process may comprise a process for transmitting a massage indicating that a congestion occurs to a transmitting terminal of data transmitted through the each channel (sixth). For example, a CLLM (Consolidated Link Layer Management) message is transmitted to the transmitted terminal of the frame to be data, the transmitted terminal of the frame receives the CLLM message, whereby a congestion control is performed.

One of the above-mentioned traffic restrictive processes may be performed, and the plural traffic restrictive processes may be also performed synchronously. The correspondence between the traffic restrictive level and the traffic restrictive process can be set suitably.

The traffic restrictive process may be performed based on a maximum transmission rate set for the each channel (seventh aspect).

In the traffic control method of the present invention, the data quantity may be measured as to data transmitted from each of the plural frame relay networks to the ATM network through the each channel (second aspect).

In the traffic control method, a traffic restrictive class set for the each channel may be detected, and the traffic restrictive process corresponding to the traffic restrictive class which is detected may be performed. In this case, the traffic restrictive process can be performed in accordance with the importance of the channel, therefore, channels can be discriminated. Any number of channels can be available, and the channels include a physical channel, a virtual channel, a logical channel (data links) and so on. The traffic restrictive classes can be set at any number of steps.

At least one of the plural terminals may be connected to the ATM network through no frame relay network (eighth aspect).

The present invention also relates to a network system comprising an ATM (Asynchronous Transfer Mode) network, plural frame relay networks respectively connected to the ATM network through channels, plural terminals respectively connected to the plural frame relay networks through channels, a data quantity measurement unit for measuring a data quantity transmitted through each channel, a restrictive level operation unit for operating a traffic restrictive level corresponding to the data quantity measured by the data quantity measurement unit, a restrictive process storage unit for storing a traffic restrictive process corresponding to the traffic restrictive level operated by the restrictive level operation unit, and a traffic control unit for reading the traffic restrictive process corresponding to the traffic restrictive level operated by the restrictive level operation unit from the restrictive process storage unit and for performing the traffic restrictive process read from the restrictive process storage unit.

The present invention relates to a frame relay switch in plural frame relay networks in a network system comprising an ATM (Asynchronous Transfer Mode) network, the plural frame relay networks respectively connected to the ATM network through channels and provided with plural frame relay switch, and plural terminals respectively connected to the plural frame relay networks through channels. The frame relay switch comprises a data quantity measurement unit for measuring a data quantity transmitted through each channel, a restrictive level operation unit for operating a traffic restrictive level corresponding to the data quantity measured by the data quantity measurement unit, a restrictive process storage unit for storing a traffic restrictive process corresponding to the traffic restrictive level operated by the restrictive level operation unit, and a traffic control unit for reading the traffic restrictive process corresponding to the traffic restrictive level operated by the restrictive level operation unit and performing the traffic restrictive process read from the restrictive process storage unit.

BRIEF DESCRIPTION OF THE DRAWINGS

Other objects and advantages of the present invention will become apparent during the following discussion conjunction with the accompanying drawings, in which:

FIG. 2 is an explanatory view of channels in the network system shown in FIG. 1;

FIG. 10 is a structural view of a task number storage table shown in FIG. 5;

FIG. 17 is a view for explaining an outline of a traffic restrictive process in the network system.

DETAILED DESCRIPTION OF THE PREFERRED EMBODIMENTS

Detailed explanations will be given of a traffic control method, a network system and a frame relay switch according to the present invention based on a preferred embodiment shown in drawings.

Figure 1:
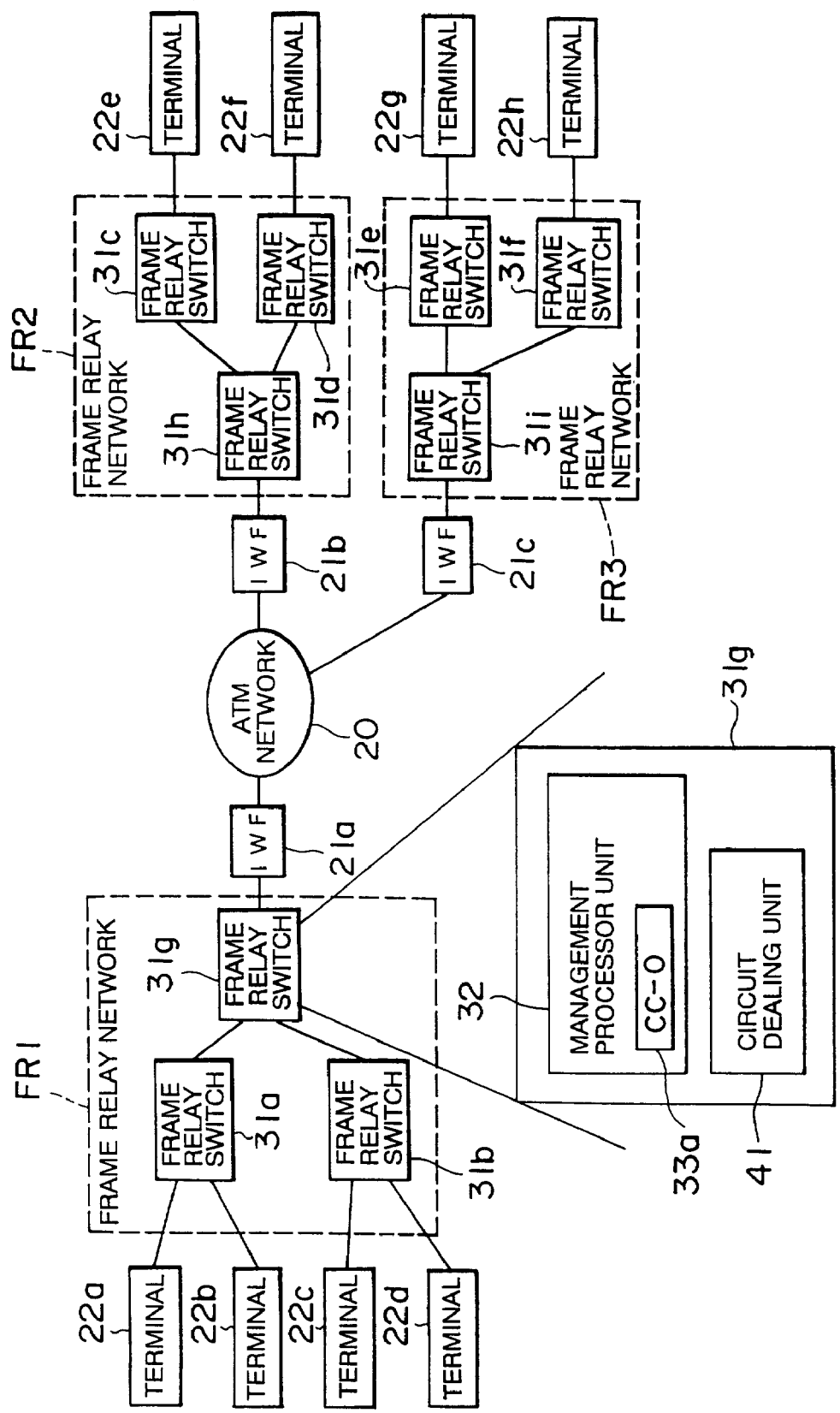
FIG. 1 is a whole structural view of a network system according to an embodiment of the preset invention.

First, an explanation will be given of an outline of the network system according to this embodiment with reference to FIGS. 1, 2. FIG. 1 is a whole structural view of the network system according to this embodiment. In FIG. 1, an ATM network 20 is connected with three frame relay networks FR1, FR2, FR3 via IWFs (InterWork Function) 21a–21c, respectively. The frame relay networks FR1, FR2, FR3 are respectively connected with plural frame relay terminals (hereinafter, simply called "terminal") 22a–22h.

Figure 3A:
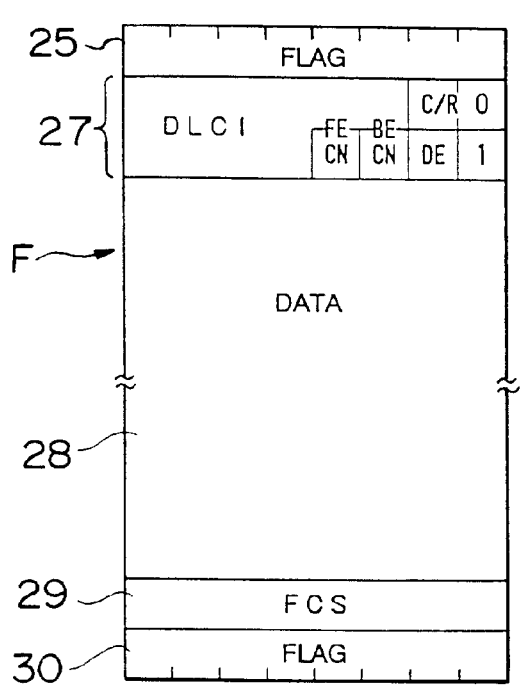
FIGS. 3(a) and 3(b) are structural views of a frame and a cell.
Figure 3B:
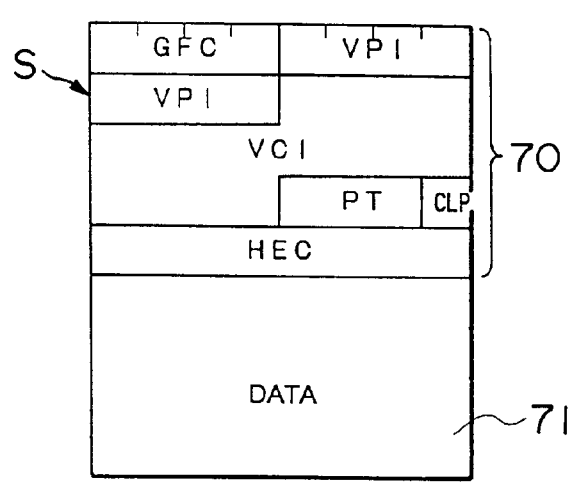

The ATM network 20 is provided with plural ATM switches (VCH, VPH) not shown and repeats a frame F (see FIG. 3(a)) between the frame relay networks FR1, FR2, FR3 by using a cell S (see FIG. 3(b)). The IWFs 21a–21c are repeaters for changing a frame F transmitted from one of the frame relay networks FR1–FR3 connected thereto into cells S (see FIG. 3(b)) so as to transmit the cells S to the ATM network 20 and for assembling cells S received from the ATM network 20 into a frame F so as to transmit the frame F to one of the frame relay networks FR1–FR3 connected thereto. The respective frame relay networks FR1–FR3 is provided with plural frame relay switches 31 connected through frame relay circuits (physical channel). The respective terminals 22a–22h are respectively connected with one of the frame relay switches 31a–31f via the frame relay circuits in the respective frame relay networks FR1–FR3. Each terminal 22a–22h, when data is transmitted to another terminal, generates a frame F and transmits it to one of the frame relay switches 31a–31f connected thereto.

FIG. 2 is an explanatory view of channels set in the network system shown in FIG. 1. In FIG. 2, four data links (logical channels) connecting the IWF 21a and the respective terminals 22a–22d are set in the physical channel (frame relay circuit) connecting between the terminals 22a–22d and the IWF 21a. Then, DLCI (Data Link Connection Identifier) numbers a–d are respectively set for the data links (hereinafter, respective data links are called "DLCIa, DLCIb, DLCIc, DLCId"). Similarly, the terminal 22e and the IWF 22b are connected via the data link of the DLCI number e (hereinafter, called "DLCIe"), and the terminal 22f and the IWF 22b are connected via the data link of the DLCI number f (hereinafter, called "DLCIf"). Moreover, the terminal 23g and the IWF 21c are connected via the data link of the DLCI number g (hereinafter, called "DLCIg"), and the terminal 22h and the IWF 21c are connected via the data link of the DLCI number h (hereinafter, called "DLCIh").

In FIG. 2, two VCs (Virtual Channels) are set between the IWF 21a and the ATM network 20, and a not shown VP (Virtual Path) in which these VCs are put together is also set therebetween. A $VCCx_1$ and a $VCCx_2$ which are VCCs (Virtual Channel Connections) of the respective VCs are also set. The $VCCx_1$ is connected with the DLCIa and the DLCIb, and the $VCCx_2$ is connected with the DLCIc and the DLCId. Similarly, a VCCy which is a VCC of the VC is also set, and is connected with the DLCIe and the DLCIf. A VCCz which is a VCC of the VC is also set, and is connected with the DLCIg and the DLCIh. The $VCCx_1$, the $VCCx_2$, the VCCy and the VCCz are connected one another through the ATM network 20. As above described, a VCC is allocated to each IWF 21a–21c every transmitted frame relay network (frame relay network connected with a transmitted terminal of a frame F). Then, every VCC (VCI, VPI) connecting each IWF 21a–21c and the ATM network 20, a maximum transmission rate (PCR: Peak Cell Rate) indicating the quantity of the maximum transmission data which can be transmitted via that VCC is set.

Traffic restrictive class (restrictive class) indicating importance of each data link is set for each of DLCIa–DLCIh. The restrictive class is divided into three stages including a usual class, an important class and a most important class, and one of the classes is set for each of DLCIa–DLCIh as a restrictive class of a stage corresponding to the importance of the data link. Traffic restrictive level (restrictive level) indicating a traffic restrictive level corresponding to the quantity of data transmitted via each DLCIa–DLCIh (transmitted data quantity) is set for each of DLCIa–DLCIh. The restrictive level is divided into five stages including non-restriction, and first-fourth restrictions in accordance with the transmitted data quantity, and is varied in accordance with the increase and decrease of the transmitted data quantity. In this network system, a traffic restrictive process is performed in accordance with the above mentioned restrictive level and restrictive class in the frame relay networks FR1–FR3.

Next, an explanation will be given of a frame F and a cell S transmitted in this network system with reference to FIGS. 3(a) and 3(b). FIG. 3(a) is an explanatory view showing a format of a frame F transmitted between a terminal and an IWF, and FIG. 3(b) is an explanatory view showing a format of a cell S transmitted among an IWF, an ATM network, and an IWF.

In FIG. 3(a), the frame F is structured based on the ITU-T (International Telecommunication Union-Telecommunication Standardization Sector) recommendation Q. 922. The frame F includes a core header 27 and a data part 28. Further, a head flag 25 is added to the head of the core header 27, and a FCS (Frame Check Sequence) 29 and a tail flag 30 are added to the tail of the data part 28. The core header 27 is the Q. 922DL core header which stores a DLCI (Data Link Connection Identifier) number, a FECN (Forward Explicit Notification-bit), a BECN (Backward Explicit Notification-bit), a DE (Discard Eligibility indicator) and so on. The DLCI number is an identifier to transmit the frame F to a predetermined terminal (transmitted terminal) by identifying plural data links (logical channels) set in this network system. The frame F is transmitted through the data link having the DLCI number corresponding to the DLCI number stored in itself (the frame F). The FECN is information (bit) for informing that a congestion avoidance procedure is necessary for a transmitted terminal of the frame F. The BECN is information (bit) for informing that a congestion avoidance procedure is necessary for a transmitting terminal of a frame F. The FECN and the BECN are usually set to "0", and, when a congestion occurs, are changed to "1" in the frame relay network (frame relay switch) which the congestion occurs. The DE is information whether the frame F must be discarded in taking priority over another frame or not, and when the DE is "1", the frame is discarded in taking priority. In the data part 28, user communication data of the terminals 22a–22h and the like are stored. In the FCS 29, information for detecting an error of the frame F is stored. Further, the head and tail of the frame F can be recognized by the head flag 25 and the tail flag 30.

In FIG. 3(b), the cell S is provided with a cell header 70 of 5 octet and a data part 71 of 48 octet. In the cell header 70, a VPI (Virtual Path Identifier), a VCI (Virtual Channel Identifier) and the like are stored. The VPI and the VCI are identifiers for selecting a communication path (VCC) for the cell S. The VPI and the VCI are identified in the IWFs 21a–21c and the ATM network 20, whereby the cell S is transmitted via a suitable communication path (VCC). The data part 71 is an area for storing communication data of the terminals 22a–22h and so on. When a frame F is disassembled into cells S in the IWFs 21a–21c, the core header 28 and the data part 28 of the frame F are divided per 48 octet, each part of divided frame becomes a content of the data part 71 in the cell S. Then, the cell header 40 is added to each part of divided frame, whereby plural cells are formed.

Next, an explanation will be given of an outline of the traffic restrictive process in this network system with reference to FIG. 17.

FIG. 17, in relation to the restrictive classes and the restrictive levels, shows traffic restrictive processes (restrictive tasks) which are preformed on the basis of combinations of the restrictive classes and the restrictive levels. As shown in FIG. 17, for each restrictive level, a condition expression to be that restrictive level is set as follows. Concretely, a condition expression which a restrictive level becomes non-restriction (expression 1), a condition expression which a restrictive level becomes a first restriction (expression 2), a condition expression which a restrictive level becomes a second restriction (expression 3), a condition expression which a restrictive level becomes a third restriction (expression 4) and a condition expression which a restrictive level becomes a fourth restriction (expression 5) are set;

$$SD \leq maxR \times t1 \times n1 \quad \text{(expression 1)}$$

$$maxR \times t1 \times n1 < SD \leq maxR \times t1 \times n1 \leq maxR \times t1 \times n2 \quad \text{(expression 2)}$$

$$maxR \times t1 \times n2 < SD \leq maxR \times t1 \times n1 \leq maxR \times t1 \times n3 \quad \text{(expression 3)}$$

$$maxR \times t1 \times n3 < SD \leq maxR \times t1 \times n1 < maxR \times t1 \times n4 \quad \text{(expression 4)}$$

$$maxR \times t1 \times n4 < SD \quad \text{(expression 5).}$$

In the (expression 1)–(expression 5), the SD indicates a cumulative transmission data quantity for a predetermined time (t1) from starting to time at a given time and the t1 indicates a measuring time (predetermined time) of data quantity. The maxR indicates an allowable maximum rate. The allowable maximum rate is an allowable maximum transmission rate which cells S can be transmitted to the ATM network 20, and the same value as the PCR (Peak Cell Rate) determined every VCC is set as the allowable maximum rate. The n1–n4 are first-fourth restrictive coefficients, and ranges thereof are set as $0<n1<n2<n3<n4\leq 1$.

When a restrictive class is the usual class, the following traffic restrictive process is performed in accordance with restrictive levels. That is, when a restrictive level is non-restriction, no traffic restrictive process is performed (process task (1)). When a restrictive level is the first restriction, in each frame relay network FR1–FR3, "1" is set into the FECN in the core header 27 (see FIG. 3(a)) of a frame F to be transmitted (process task (2)) and "1" is set into the BECN in the core header 27 of a received frame F (process task (5)). When a restrictive level is the second restriction, in each frame relay network FR1–FR3, when "0" is set in the DE of the core header 27 of a frame F to be transmitted, "1" is set into the FECN of the frame F, and when "1" is set in the DE, the frame F is discarded (process task (3)). The above-mentioned process task (5) is also performed for the received frame F. When a restrictive level is the third restriction, in each frame relay network FR1–FR3, the same traffic restrictive process as the second restriction, namely, the process task (3) and the process task (5) are performed. When a restrictive level is the fourth restriction, in each frame relay network FR1–FR3, the transmitted frame is discarded (process task (4)), and the above-mentioned process task (5) is performed.

Further, when the restrictive class is the important class, the following traffic restrictive process is performed in accordance with the restrictive levels. That is, when a restrictive level is non-restriction or the first restriction, the process task (1) is performed, namely, no traffic restrictive process is performed. When a restrictive level is the second restriction, in each frame relay network FR1–FR3, the process task (2) and the process task (5) are performed. When a restrictive level is the third restriction, in each frame relay network FR1–FR3, the process task (3) and the process task (5) are performed. When a restrictive level is the fourth restriction, in each frame relay network FR1–FR3, the process task (4) and the process task (5) are performed.

Moreover, when the restrictive class is the most important class, the following traffic restrictive process is performed in accordance with the restrictive levels. That is, when a restrictive level is non-restriction or one of the first-third restrictions, the process task (1) is performed, namely, no traffic restrictive process is performed. When a restrictive level is the fourth restriction, in each frame relay network FR1–FR3, the process task (4) and the process task (5) are performed.

Figure 4:
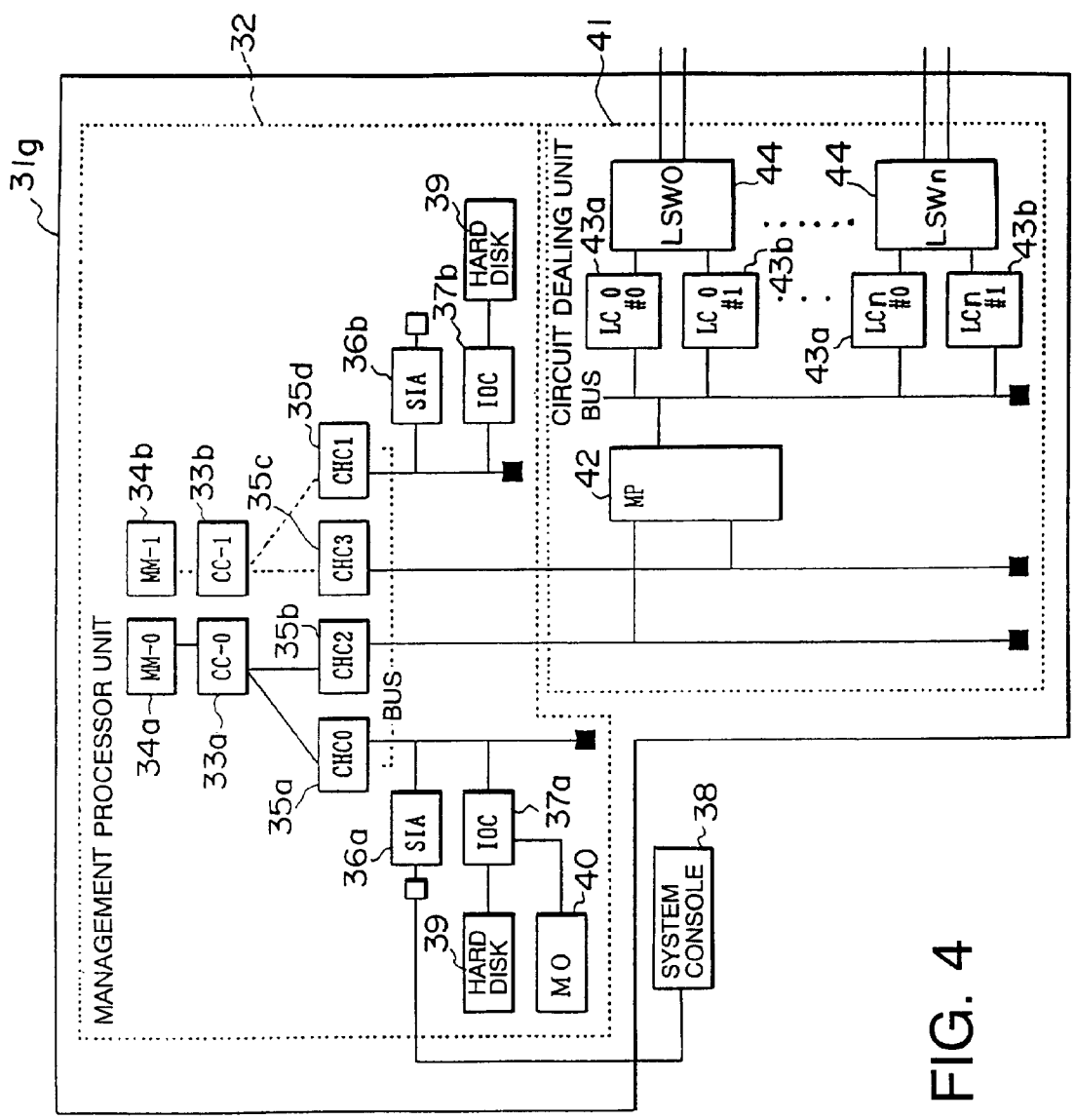
FIG. 4 is a circuit structural view of a frame relay switch shown in FIG. 1.
Figure 14:
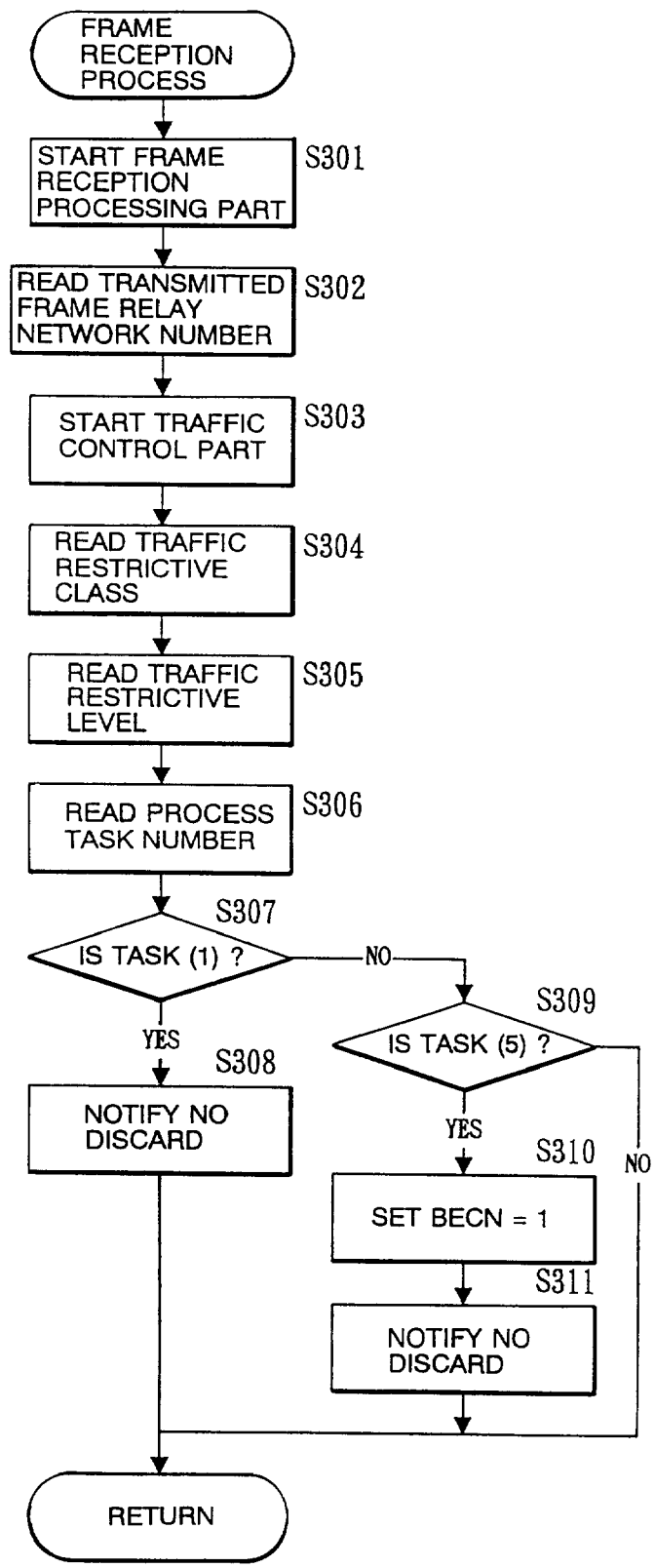
FIG. 14 is a flow chart illustrating a process by a frame relay switch shown in FIG. 1.

Next, an explanation will be given of frame relay switches 31a–31i in the respective frame relay networks FR1–FR3. FIG. 4 is a sample of a circuit structural view of each frame relay switch 31. Each frame relay switch 31a–31i has the same structure, therefore, the explanation is given by using the frame relay switch 31g as a sample. In FIG. 14, the frame relay switch 31g is provided with a management processor unit 32 and a circuit dealing unit 41.

The management processor unit 32 performs the control and the monitor all over the frame relay switch 31, the maintenance and management for various data, the input/output control for commands and messages, the making and the keeping of connection records and the like. The management processor unit 32 is provided with an active CC (Central Controller) 33a, a spare CC 33b, an active MM (Main Memory) 34a connected with the CC 33a via a bus, a spare MM 34b connected with the CC 33b via a bus, an active CHCs (Channel Controller) 35a, 35b respectively connected with the CC 33a via buses, a spare CHCs 35c, 35d respectively connected with the CC 33b via buses, SIAs (Serial Interface Adapter) 36a, 36b and IOCs (disk Input Output Controller) 37a, 37b respectively connected with the CHCs 35a, 35d via buses, a system console 38 connected with the SIA 36a, hard disks 39 respectively connected with the IOCs 37a, 37b, and a MO (Magnetic Optical disk) 40 connected with the IOC 37a.

The hard disk 39 is a medium storing a control program (computer program) for the frame relay switch 31g and data to perform the control program. The respective MMs 34a, 34b are operating areas for the CCs 33a, 33b, and when the CCs 33a, 33b perform the control program stored in the hard disk 39, the control program is loaded to the MMs 34a, 34b. The CCs 33a, 33b perform the control programs respectively loaded to the MMs 34a, 34b, and send commands to the respective parts in the frame relay switch 31g to perform the operational control for the respective parts.

The respective CHCs 35a–35d perform the control of the input output channel (physical channel, logical channel) and the control of the data transfer with the MMs 34a, 34b in accordance with the commands from the respective CCs 33a, 33b. The IOCs 37a, 37b control the operations of the hard disks 39 and the MO 40 in accordance with the commands from the respective CCs 33a, 33b. The MO 40 functions as an external unit of the frame relay switch 31g and performs the loading of the initial program, the drawing up of data and the like.

The system console 38 is an interface for outputting data stored in the hard disks 39 and the MO 40, performed results in the CCs 33a, 33b and so on to the outside, and for inputting data, commands and so on from the outside.

The circuit dealing unit 41 is a CMU (Communication Multiplexer Unit) accepting plural circuits (physical channel, virtual channel, logical channel). The circuit dealing unit 41 is provided with MPs (line Management Processor) 42 respectively connected with the CHCs 35b, 35c via buses, plural pairs of LCs (Line Controller) 43a (active), 43b (spare) respectively connected with the MP 42 via a bus, and plural LSW (Line Switch) 44 connected with the respective pairs of the LCs 43a, 43b.

Each LSW 44 accepts plural circuits (physical channel) and receives the frame F transmitted from the outside. Each LSW 44 also transmits the frame F received from the LC 43a or the LC 43b to suitable circuits. At that time, each LSW 44 transmits the frame F to the circuits corresponding to commands from the MP 42. Moreover, the LSW 44 receives the commands from the MP 42 via each LC 43a, 43b, and controls logical, electrical and physical interfaces in accordance with those commands.

The LCs 43a, 43b perform a frame relay protocol process. The LCs 43a, 43b, when receive a frame F from one of LSWs 44, send the frame F to the MP 42. The LCs 43a, 43b also send the frame F received from the MP 42 to one of the LSWs 44. Further, the LCs 43a, 43b are provided with circuit end functions for making the plural circuits end.

The MP 42 manages the line setting in the line dealing unit 41. That is, the MP 42 controls the communications between the CHCs 35b, 35c and the LCs 43a, 43b, respectively. Concretely, one of each pair of the LCs 43a, 43b is made in an operating status (active) and the other is made in a stopping status (spare). The MP 42, when receives a frame F from the active LC 43a, sends the received frame F to the active CHC 35b. In this way, the frame F is stored in the active MM 34a, and then a predetermined process is performed for the frame F. On the contrary, the MP 42, when receives a frame F from the CHC 35b, sends the frame F to the active LC 43a. Moreover, the MP 42 sends a transmitting command that a frame F is transmitted from which circuits accepted in each LSW 44. The transmitting command is sent to the respective LSWs 44 through the LC 43a, 43b.

The frame relay switch 31g structured like this performs the transmitting/receiving process of the frame F in accordance with the ITU-T recommendation Q. 922 and the ITU-T recommendation Q. 933. Concretely, each frame relay switch 31a–31i performs the transmitting/receiving process of the frame F between the each terminal 22a–22h and each frame relay network FR1–FR3 and between each frame relay network FR1–FR3 and each IWF 21a–21c.

Figure 5:
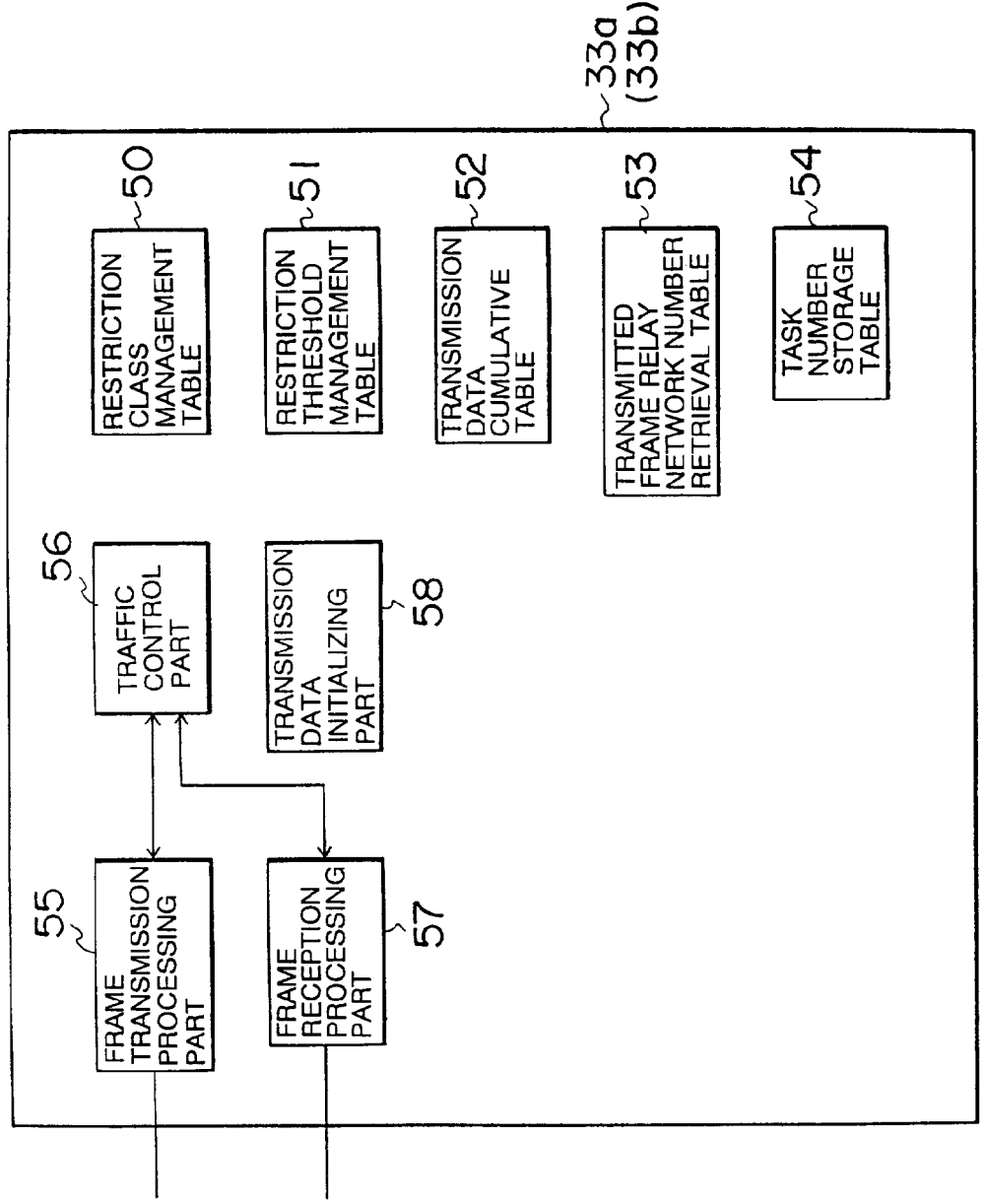
FIG. 5 is a block diagram illustrating functions implemented by performing a control program in the frame relay switch shown in FIG. 4.

Next, an explanation will be given of functions implemented by loading the control program stored in the hard disk 39 in the frame relay switch 31 to the MMs 34a, 34b and by performing the control program in the CCs 33a, 33b (through the MMs 34a, 34b) with reference to the block diagram shown in FIG. 5. As shown in FIG. 5, the control program is performed in the CCs 33a, 33b, whereby a restrictive class management table 50, a restrictive threshold management table 51, a transmission data cumulative table 52, a transmitted frame relay network number retrieval table 53, and a task number storage table 54, are maked. Further, the control program is performed in the CCs 33a, 33b, whereby a frame transmission processing part 55, a traffic control part 56, a frame reception processing part 57 and a transmission data initializing part 58 are realized.

The restrictive class management table 50 corresponds to restrictive class storage means of the present invention. The task number storage table 54 corresponds to restrictive process storage means of the present invention. The traffic control part 56 corresponds to data quantity measurement means, restrictive level operation means, and traffic control means of the present invention.

Figure 6:
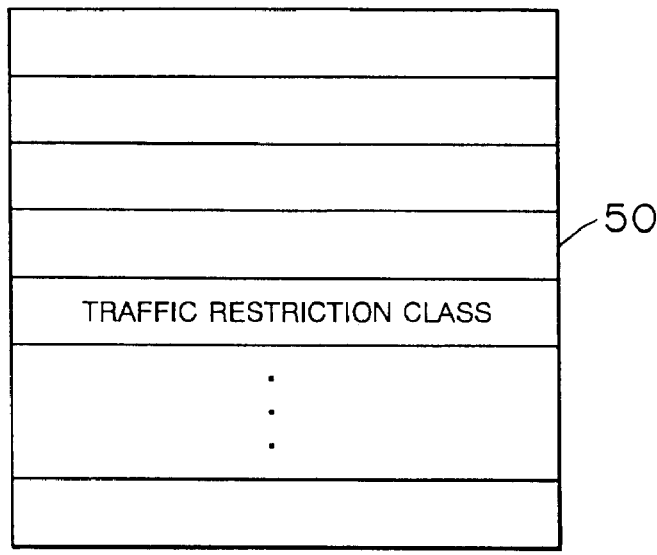
FIG. 6 is a structural view of a restrictive class management table shown in FIG. 5.

FIG. 6 is a structural view of the restrictive class management table 50. In FIG. 6, restrictive class management table 50 is provided with the plural areas which can be retrieved by a transmitted frame relay network number (peculiar number set for each frame relay network FR1–FR3, namely, peculiar number of a frame relay network connected with a transmitted terminal of the frame F). One of the above mentioned restrictive class is stored in each area in relation to the DLCI number corresponding to the transmitted frame relay number. The restrictive class management table 50 can be retrieved by the transmitted frame relay network number and the DLCI corresponding to the transmitted frame relay network number as retrieval keys.

Figure 7:
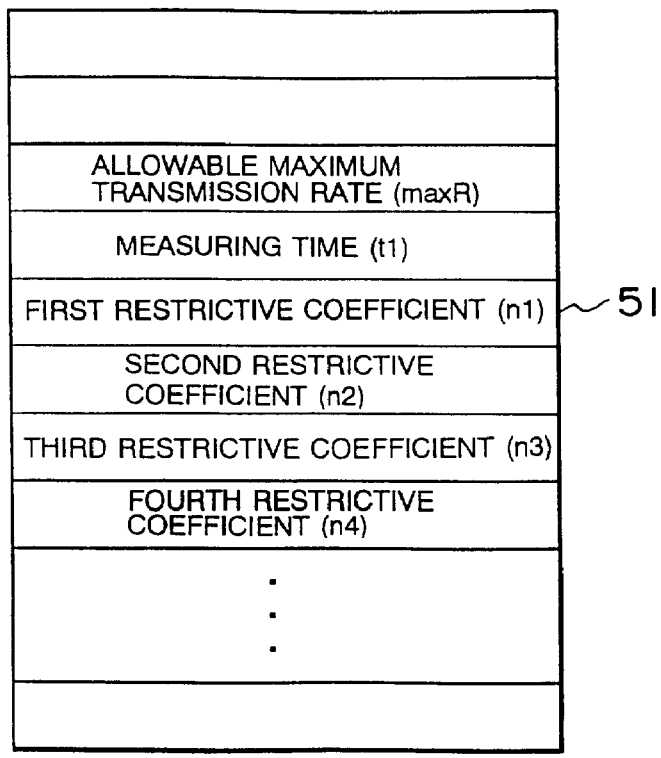
FIG. 7 is a structural view of a restrictive threshold management table shown in FIG. 5.

FIG. 7 is a structural view of the restrictive threshold management table 51. In FIG. 7, values for operating the above-mentioned restrictive levels are stored in the restrictive threshold management table 51 every transmitted frame relay network number. Concretely, the allowable maximum transmission rate (maxR), the measuring time (t1) and the first-fourth restrictive coefficients (n1–n4) are stored in the restrictive threshold management table 51 every transmitted frame relay network number. The restrictive threshold management table 51 can be retrieved by using the transmitted frame relay network number as a retrieval key.

Figure 8:
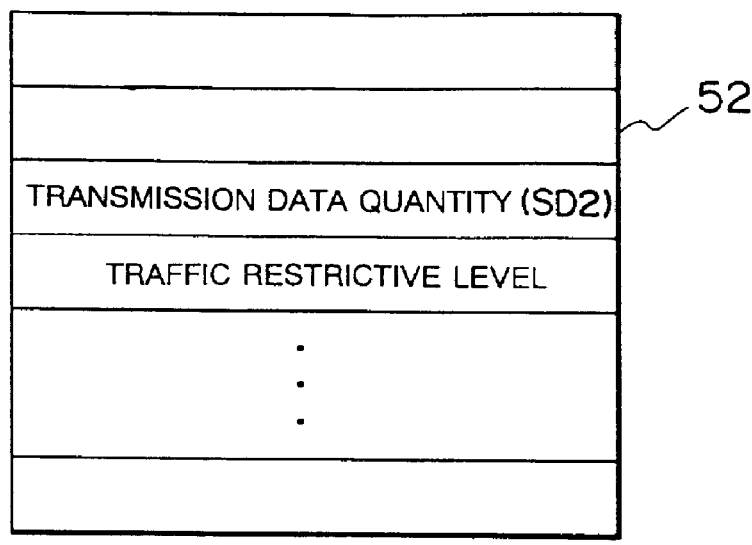
FIG. 8 is a structural view of a transmission data cumulative table shown in FIG. 5.

FIG. 8 is a structural view of the transmission data cumulative table 52. In FIG. 8, a cumulative transmission data quantity (SD2) and one of the above mentioned restrictive levels are stored in the transmission data cumulative table 52 every transmitted frame relay network number. The transmission data cumulative table 52 can be retrieved by using the transmitted flame network number as a retrieval key.

Figure 9:
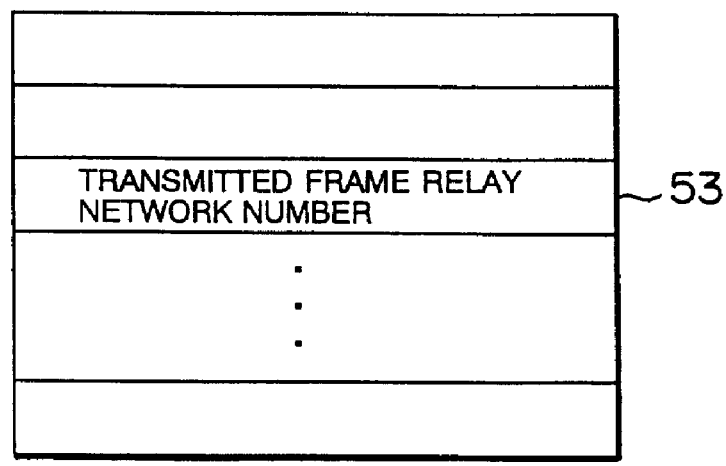
FIG. 9 is a structural view of a transmitted frame relay network number retrieval table shown in FIG. 5.

FIG. 9 is a structural view of the transmitted frame relay network number retrieval table 53. In FIG. 9, a transmitted frame relay network number is stored in the transmitted frame relay network number retrieval table 53 every DLCI number. The transmitted frame relay network number retrieval table 53 can be retrieved by using the DLCI number as a retrieval key.

FIG. 10 is a structural view of the task number storage table 54. In FIG. 10, the task number storage table 54 is provided with a transmitting process task storage area 54a and a receiving process task storage area 54b. Each storage area 54a, 54b is divided into three class areas 59 corresponding to the above mentioned three restrictive classes, and the above-mentioned process tasks (1)–(5) are stored in each class area 59 in relation to the restrictive levels. The task number storage table 54 can be retrieved by using process identifier information (transmitting process information (bit "0"), receiving process information (bit "1")) indicating that one of the transmitting process and the receiving process is performed, a restrictive class and a restrictive level as retrieval keys. That is, one of the transmitting process task storage area 54a and the receiving process task storage area 54b is selected by the process identifier information, one of the class areas 59 is selected by a restrictive class, and one of the process tasks (1)–(5) is read by a restrictive level so as to correspond to that restrictive level.

The frame transmission processing part 55 shown in FIG. 5 starts, when a frame F is transmitted from one of the frame relay networks FR1–FR3 to one of the IWFs 21a–21c. The frame transmission processing part 55 reads the transmitted frame relay network number out from the transmitted frame relay network number retrieval table 53 (see FIG. 9). The traffic control part 56 starts by receiving the transmitted frame relay network number, the DLCI number, and the process identifier information (receiving process information held the frame transmission processing part 55) from the frame transmission processing part 55. The frame transmission processing part 55 receives a notification requiring a discard or a notification requiring no discard of a frame F from the traffic control part 56, determines whether the frame F is discarded or not, and discards the frame F when it is determined that the frame F is discarded.

The frame reception processing part 57 starts when a frame F is received by one of the frame relay networks FR1–FR3 through one of the IWFs 21a–21c. The frame reception processing part 57 reads the transmitted frame relay network number out from the transmitted frame relay network number retrieval table 53 (see FIG. 9). The traffic control part 56 starts by receiving the transmitted frame relay network number, the DLCI number, and the process identifier information (receiving process information held the frame reception processing part 57) from the frame reception processing part 57.

The traffic control part 56 starts by receiving a notification from the frame transmission processing part 55 or the frame reception processing part 57. The traffic control part 56 reads the restrictive class out from the restrictive class management table 50 (see FIG. 6). Successively, the traffic control part 56 operates the restrictive level based on the value stored in the restrictive threshold management table 51 (see FIG. 7). Then, the traffic control part 56 reads out the process task number from the task number storage table 54 by using the restrictive class and the restrictive level, and the traffic control part 56 performs the process task corresponding to the process task number.

The transmission data initializing part 58 starts every predetermined cycle and initializes contents in the transmission data cumulative table 52.

Next, an explanation will be given of processes by each frame relay switch 31a–31i with reference to flow charts shown in FIGS. 11–14. As a premise, when a frame is received by one of frame relay switches 31a–31i, the frame F is stored in the MM 34a through the LS 44, the LC 43a, the MP 42 and the CHC 35b.

Figure 11:
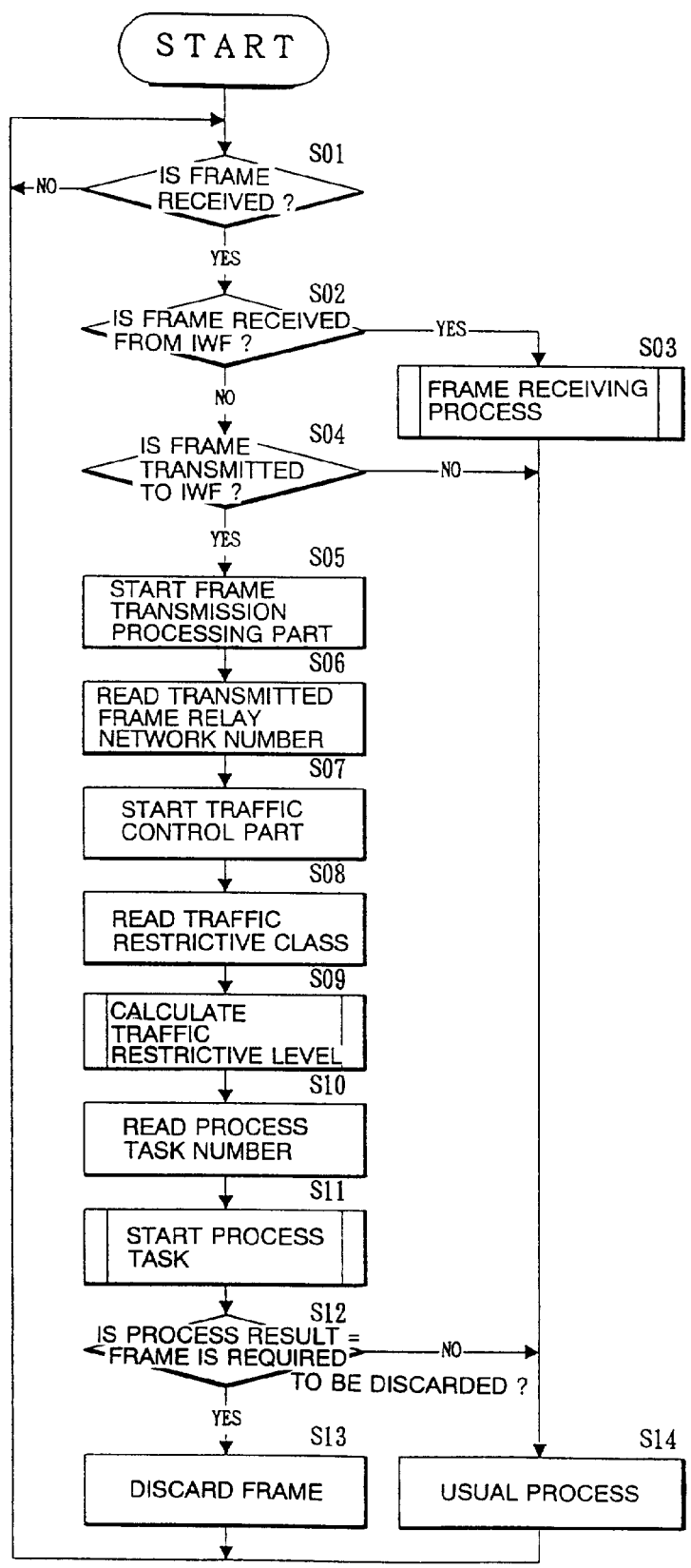
FIG. 11 is a flow chart illustrating a process by a frame relay switch shown in FIG. 1.

As shown in FIG. 11, in the step S01, it is determined whether a frame is received or not. The step S01 is repeated until a frame F is received. That is, the step S01 is a state that a receipt of a frame F is waited, thereafter the process is advanced to the step S02 when a frame F is received.

In the step S02, it is determined whether the frame F is received from one of the IWFs 21a–21c or not. This determination is performed by referring the circuit number (DLCI number) which receives the frame F in the step S01. When it is determined that the frame F is received from one of the IWFs 21a–21c, the process is advanced to the step S03. When it is not determined that the frame F is received from one of the IWFs 21a–21c, it is determined that the frame F is received from one of the terminals 22a–22h or another frame relay switch 31, thereafter the process is advanced to the step S04.

In the step S04, it is determined whether the frame F should be transmitted to one of the IWFs 21a–21c. This determination is performed by referring the circuit number (DLCI number) for transmitting the frame F similarly to the step S02. Then, when it is not determined that the frame should be transmitted to one of the IWFs 21a–21c, an usual process is performed in the step S14 and the frame F is transmitted to another frame relay switch or a terminal except for the transmitting terminal. When it is determined that the frame should be transmitted to one of the IWFs 21a–21c, thereafter the process is advanced to the step S05.

In the step S05, the frame transmission processing part 55 starts.

In the step S06, the frame transmission processing part 55 retrieves the transmitted frame relay network retrieval table 53 by using the DLCI number stored in the core header 27 of the frame F as a retrieval key and reads the transmitted frame relay network number.

In the step S07, the frame transmission processing part 55 informs the transmitted frame relay network number obtained in the step S06, the DLCI number, and the transmission process information which is the process identifier information the traffic control part 56. Then, the traffic control part 56 starts.

In the step S08, the traffic control part 56 retrieves the restrictive class management table 50 (see FIG. 6) by using the transmitted frame relay network number received from the frame transmission processing part 55 and the DLCI number as retrieval keys and reads out the restrictive class corresponding to the retrieval keys.

Figure 12:
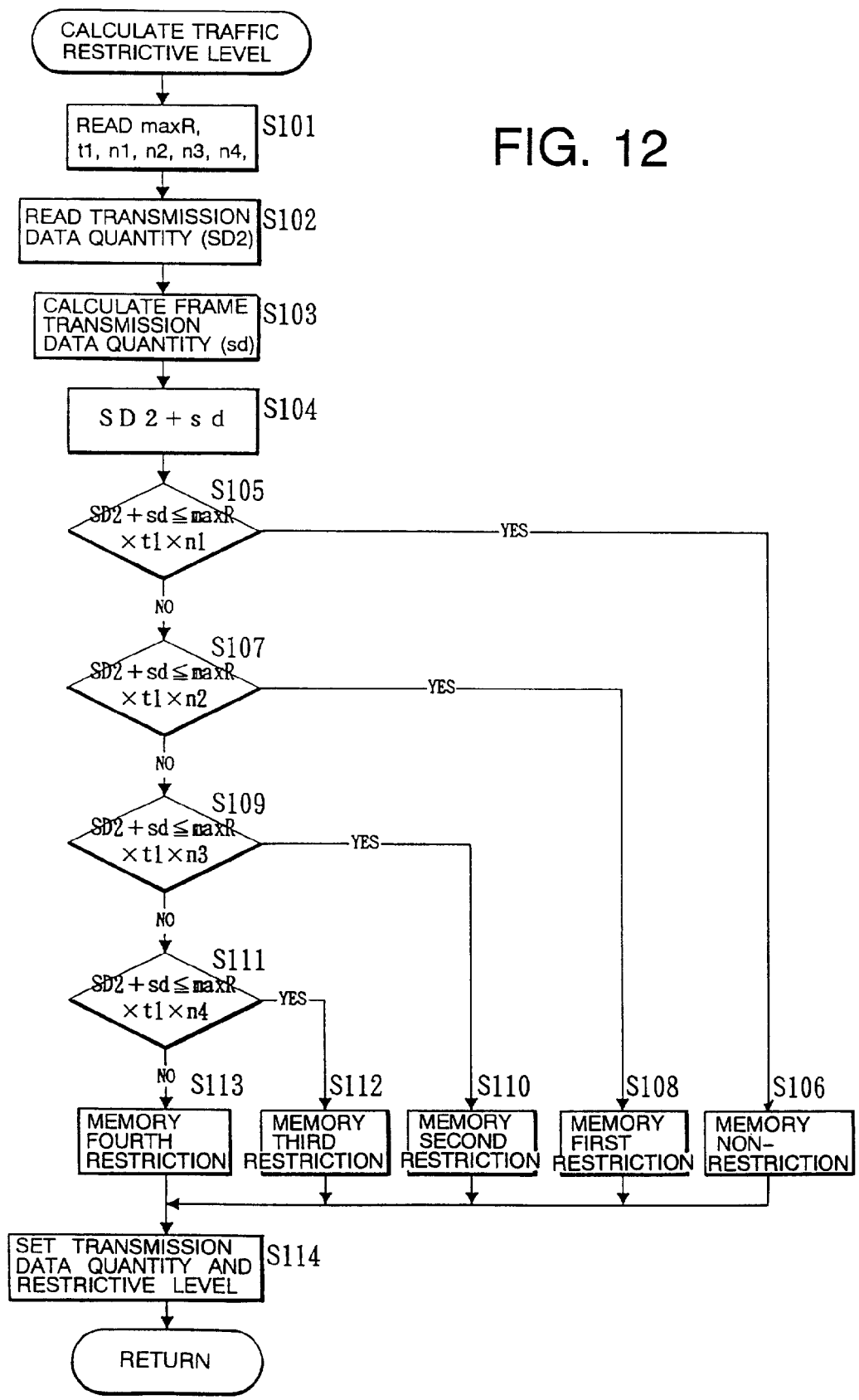
FIG. 12 is a flow chart illustrating a process by a frame relay switch shown in FIG. 1.

In the step S09, the traffic control part 56 retrieves the restrictive threshold management table 51 (see FIG. 7) by using the transmitted frame relay network number received from the frame transmission processing part 55 as a retrieval key and operates the restrictive level by using each value stored correspondingly to the retrieval key. FIG. 12 is a flow chart illustrating a traffic restrictive level operating subroutine performed in the step S09.

In the step S101 in this subroutine, first, the traffic control part 56 retrieves the restrictive threshold management table 51 by using the transmitted frame relay network number received from the frame transmission processing part 55 as a retrieval key and reads out maxR, t1, n1, n2, n3 and n4 corresponding to the retrieval key.

In the step S102, the traffic control part 56 retrieves the transmission data cumulative table 52 (see FIG. 8) by using the transmitted frame relay network number received from the frame transmission processing part 55 as a retrieval key and reads out a cumulative transmission data quantity (SD2) corresponding to the retrieval key.

In the step S103, the traffic control part 56 calculates the transmission quantity of the frame F to be transmitted to one of the IWFs 21a–21c by using the following (expression 6);

$$sd(bit)=([transmission\ data+2+2+4)\div 48]+1)\times 53\times 8 \quad \text{(expression 6)}.$$

In the (expression 6), the transmission data indicates the number of octets of the core header 27 and the data part 28 in the frame F to be transmitted to one of the IWFs 21a–21c. The "([transmission data+2+2+4)÷48]+1)" in the (expression 6) indicates the number of cells S formed by disassembling the frame F. The "×53" works out the number of octets of all cells S (data quantity) when a frame F is disassembled into plural cells S. The "×8" converts the number of octets to the number of bits.

In the step S104, the traffic control part 56 adds the SD2 obtained in the step S102 to the sd obtained in the step S103. The added value becomes transmission data quantity (SD) in the channel (data link) connecting between the frame relay network and the IWF (SD2+sd=SD).

In the step S105, the traffic control part 56 determines whether the (SD2+sd) satisfies the condition shown in the following (expression 7) or not;

$$SD2+sd \leq maxR \times t1 \times n1 \quad \text{(expression 7)}.$$

When the condition of the (expression 7) is satisfied, the opration is advanced to the step S106, and when the condition of the (expression 7) is not satisfied, thereafter the process is advanced to the step S107.

In the step S106, the traffic control part 56 determines that the SD2+sd (SD) satisfies the condition of the (expression 1), namely, the restrict level is non-restriction, and the determined result is stored in the MM 34a. Thereafter, the process is advanced to the step S114.

In the step S107, the traffic control part 56 determines whether the (SD2+sd) satisfies the condition shown in the following (expression 8) or not;

$$SD2+sd \leq maxR \times t1 \times n2 \quad \text{(expression 8)}.$$

When the condition of the (expression 8) is satisfied, the process is advanced to the step S108, and when the condition of the (expression 8) is not satisfied, the opration is advanced to the step S109.

In the step S108, the traffic control part 56 determines that the (SD2+sd) satisfies the condition of the (expression 2), namely, the restrict level is the first restriction, and the determined result is stored in the MM 34a. Thereafter, the process is advanced to the step S114.

In the step S109, the traffic control part 56 determines whether the (SD2+sd) satisfies the condition shown in the following (expression 9) or not;

$$SD2+sd \leq maxR \times t1 \times n3 \quad \text{(expression 9)}.$$

When the condition of the (expression 9) is satisfied, the process is advanced to the step S110, and when the condition of the (expression 9) is not satisfied, the process is advanced to the step S111.

In the step S110, the traffic control part 56 determines that the (SD2+sd) satisfies the condition of the (expression 3), namely, the restrict level is the second restriction, and the determined result is stored the MM 34a. Thereafter, the opration is advanced to the step S114.

In the step S111, the traffic control part 56 determines whether the (SD2+sd) satisfies the condition shown in the following (expression 10) or not;

SD2+sd≦maxR×t1×n4 (expression 10).

When the condition of the (expression 10) is satisfied, the process is advanced to the step S112, and when the condition of the (expression 10) is not satisfied, the process is advanced to the step S113.

In the step S112, the traffic control part 56 determines that the (SD2+sd) satisfies the condition of the (expression 4), namely, the restrict level is the third restriction, and the determined result is stored in the MM 34a. Thereafter, the process is advanced to the step S114.

In the step S113, the traffic control part 56 stores the fourth restriction as a restrict level in the MM 34a. Thereafter, the process is advanced to the step S114.

In the step S114, the traffic control part 56 retrieves the transmission data cumulative table 52 (see FIG. 8) by using the transmitted frame relay network number as a retrieval key, and over writes the (SD+sd) as a new transmission data quantity (SD2) stored correspondingly to the retrieval key. At the same time, the traffic control part 56 over writes the restrictive level memorized in one of the steps S106, S108, S110, S112 and S113 as a new restrictive level to be stored. Thereafter, the process in the step S114 is finished, the process returns to the main routine in FIG. 11. In the main routine to which the process is returned, the step S10 is performed.

In the step S10, the traffic control part 56 retrieves the task number storage table 54 (see FIG. 10) by using the process identifier information (transmission process information) received from the frame transmission processing part 55, the restrictive class obtained in the step S08 and the restrictive level obtained in the step S09 as retrieval keys, and reads a process task number (one of process tasks (1)–(4)) corresponding to the retrieval keys.

Figure 13:
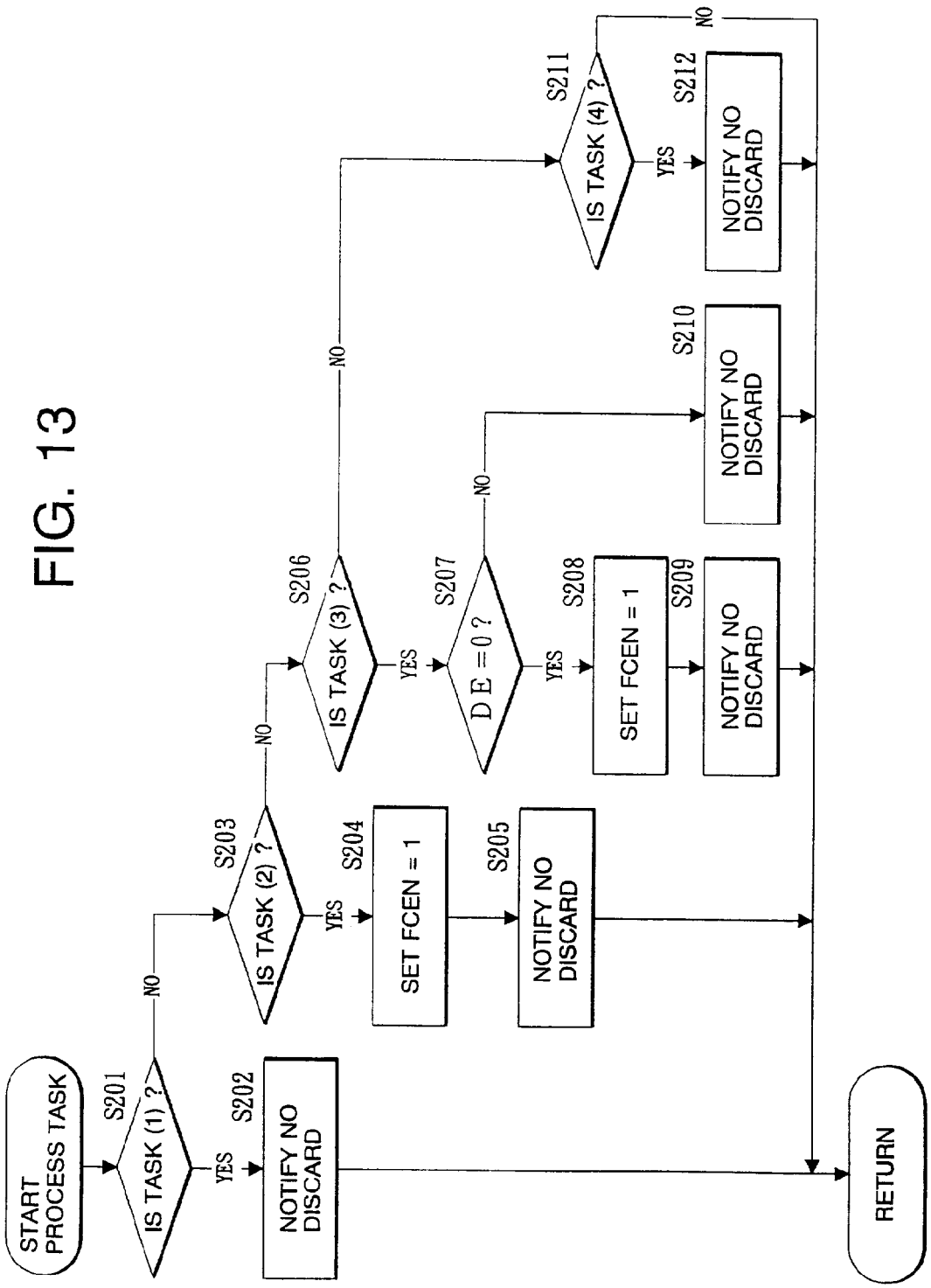
FIG. 13 is a flow chart illustrating a process by a frame relay switch shown in FIG. 1.

In the step S11, the traffic control part 56 starts (performs) the process task corresponding to the process task number read in the step 10. FIG. 13 is a flow chart showing a process task starting subroutine performed in the step 11. In the step S202 in this subroutine, the traffic control part 56 determines whether the process task number calculated in the step S09 is "(1)" or not. When it is determined that the process task number is "(1)", the process is advanced to the step S202. When it is not determined that the process task number is "(1)", the process is advanced to the step S203.

In the step S202, the traffic control part 56 performs the process task (1). That is, the traffic control part 56 informs the frame transmission processing part 55 that the frame F to be transmitted to one of the IWFs 21a–21c is unnecessary to be discarded. When the performance of the process task (1) is finished, the process returns to the step S12.

In the step S203, the traffic control part 56 determines whether the process task number calculated in the step S09 is "(2)" or not. When it is determined that the process task number is "(2)", the process is advanced to the step S204. When it is not determined that the process task number is "(2)", the process is advanced to the step S206.

In the step S204, the traffic control part 56 performs the process task (2). That is, "1" is set in the FECN of the core header 27 in the frame F to be transmitted to one of the IWFs 21a–21c. At the same time, the traffic control part 56 informs the frame transmission processing part 55 that the frame F to be transmitted to one of the IWFs 21a–21c is unnecessary to be discarded. When the performance of the process task (2) is finished, the process returns to the step S12. This process task (2) is performed, whereby a transmitted terminal (an user of a transmitted terminal) recognizes that a congestion occurs in the frame relay network FR1–FR3, and a congestion avoiding procedure (congestion control) is performed.

In the step S206, the traffic control part 56 determines whether the process task number calculated in the step S09 is "(2)" or not. When it is determined that the process task number is "(3)", the process is advanced to the step S207. When it is not determined that the process task number is "(3)", the process is advanced to the step S211.

In the steps S207–S210, the traffic control part 56 performs the process task (3).

That is, in the step S207, the traffic control part 56 determines whether "0" is set in the DE of the core header 27 in the frame F or not. When "0" is set in the DE, the process is advanced to the step S208. When "0" is not set in the DE (namely, DE=1), the process is advanced to the step S210.

In the step S208, the traffic control part 56 sets "1" in the FECN of the core header 27 in the frame F to be transmitted to one of the IWFs 21a–21c. With this arrangement, the transmitted terminal of the frame F performs a congestion avoiding procedure (congestion control), and the transmission of the frame F by the transmitted terminal is controlled.

In the step S209, the traffic control part 56 informs the frame transmission processing part 55 that the frame F to be transmitted to one of the IWFs 21a–21c is unnecessary to be discarded. When the step 209 is finished, the process returns to the main routine shown in FIG. 11.

In the step S210, the traffic control part 56 informs the frame transmission processing part 55 that the frame F to be transmitted to one of the IWFs 21a–21c is discarded. When the step 210 is finished, the process returns to the main routine shown in FIG. 11.

In the step S211, the traffic control part 56 determines whether the process task number calculated in the step S09 is "(4)" or not. When it is determined that the process task number is "(4)", the process is advanced to the step S212. When it not is determined that the process task number is "(4)", the process returns to the main routine shown in FIG. 11.

In the step S212, the traffic control part 56 performs the process task (4). That is, similarly to the process in the step S210, the traffic control part 56 informs the frame transmission processing part 55 that the frame F to be transmitted to one of the IWFs 21a–21c is discarded. Then, the performance of the process task (4) is finished, the process returns to the main routine shown in FIG. 11. In the main routine which the process is returned, the step S12 is performed.

In the step S12, the frame transmission processing part 55 determines whether the notification received from the traffic control part 56 indicates that the frame F is necessary to be discarded or not. When it is determined that the notification indicates that the frame F is necessary to be discarded, the process is advanced to the step S13. When it is determined that the notification does not indicate that the frame F is necessary to be discarded (indicates that the frame F is unnecessary to be discarded), the process is advanced to the step S14.

In the step S13, the frame transmission processing part 55 discards the frame F to be transmitted to one of the IWFs 21a–21c. With this arrangement, the number of cells transmitted from the IWFs 21a–21c to the ATM network 20 is decreased, and it is prevented that the number of cells exceeds the PCR. When the step S13 is finished, the process returns to the step S01 and accepts the next frame F.

In the step S14, an usual process is performed. That is, the frame F is transmitted through a suitable data link (one of the DLCIa–DLCIh) based on the DLCI number stored in the core header 27 of the frame F. Then, the process returns to the step SO1 and accepts the next frame F.

On the contrary, when the process is advanced to the step S03, the frame receiving process is performed. FIG. 14 is a flow chart showing a frame receiving process subroutine performed in the step S03. In the step S301 in this subroutine, first, the frame reception processing part 57 starts.

In the step S302, the frame reception processing part 57 retrieves the transmitted frame relay network number retrieval table 53 (see FIG. 9) by using the DLCI number stored in the core header 27 of the frame F as a retrieval key, and reads the transmitted frame relay network number corresponding to the retrieval key.

In the step S303, the frame reception processing part 57 informs the traffic control part 56 of the transmitted frame relay network number obtained in the step S302, the DLCI number and the process identifier information (reception process information) held therein so as to start the traffic control part 56.

In the step S304, the traffic control part 56 retrieves the restrictive class management table 50 (see FIG. 6) by using the transmitted frame relay network number and the DLCI number received from the frame reception processing part 57 as retrieval keys, and reads out a restrictive class corresponding to the retrieval keys.

In the step S305, the traffic control part 56 retrieves the transmission data cumulative table 52 (see FIG. 8) by using the transmitted frame relay network number received from the frame reception processing part 57 as a retrieval key, and reads out a traffic restrictive level.

In the step S306, the traffic control part 56 retrieves the task number storage table 54 (see FIG. 10) by using the process identifier of the reception process received from the frame reception processing part 57, the restrictive class obtained in the step S304 and the restrictive level obtained in the step S305 as retrieval keys, and reads out the process task number (one of the process tasks (1), (5)) corresponding to the retrieval keys.

In the step S307, the traffic control part 56 determines whether the process task number read in the step S306 is "(1)" or not. When it is determined that the process task number is "(1)", the process is advanced to the step S308. When it is not determined that the process task number is "(1)", the process is advanced to the step S309.

In the step S308, the traffic control part 56 performs the process task (1). That is, the traffic control part 56 informs the frame reception processing part 57 that the frame F received in the frame relay switch is unnecessary to be discarded. Then, the step S308 is finished, the process returns to the main routine shown in FIG. 11 and the usual process is performed in the step S14.

In the step S309, the traffic control part 56 determines whether the process task number read in the step S306 is "(5)" or not. When it is determined that the process task number is "(5)", the process is advanced to the step S310. When it is not determined that the process task number is "(5)", the process returns to the step S309 and the usual process is performed in the step S14.

In the steps S310, S311, the process task (5) is performed. That is, in the step S310, the traffic control part 56 sets "1" in the BECN of the core header 27 in the frame F received by the frame relay switch 31. With this arrangement, the transmitted terminal which receives the frame F recognizes that a congestion occurs in the frame relay network FR1–FR3, and performs the congestion avoiding procedure (congestion control). Thus, the transmission of the frame F from the transmitted terminal is controlled.

In the step S311, the traffic control part 56 informs the frame reception processing part 57 that the frame F received in the frame relay switch 31 is unnecessary to be discarded. Then, the step S311 is finished, the process returns to the main routine shown in FIG. 11 and the usual process is performed in the step S14. Incidentally, since the traffic control part 56 informs the frame reception processing part 57 only that the frame F is unnecessary to be discarded, the frame is not discarded by the frame reception processing part 57.

Now, the transmission data cumulative value (SD2) set in the transmission data cumulative table 52 and the restrictive level are initialized by the transmission data initializing part 58 every predetermined period. That is, a transmitted frame relay network number is inputted into the transmission data initializing part 58 every predetermined period, whereby the transmission data initializing part 58 starts. The transmission data initializing part 58 retrieves the transmission data cumulative table 52 by using the transmitted frame relay network number inputted thereto as a retrieval key, and then makes the transmission data quantity value (SD2) zero-clear and the restrictive level to be non-restriction. Additionally, the period which the same transmitted frame relay network number is inputted is set so as to be the same time as the measuring time (t1) set correspondingly to that transmitted frame relay network number in the restrictive threshold management table 51. Thus, the stored content in the transmission data cumulative table 52 is initialized every transmitted frame relay network number, namely, whenever the t1 corresponding to that network number passes.

Figure 15:
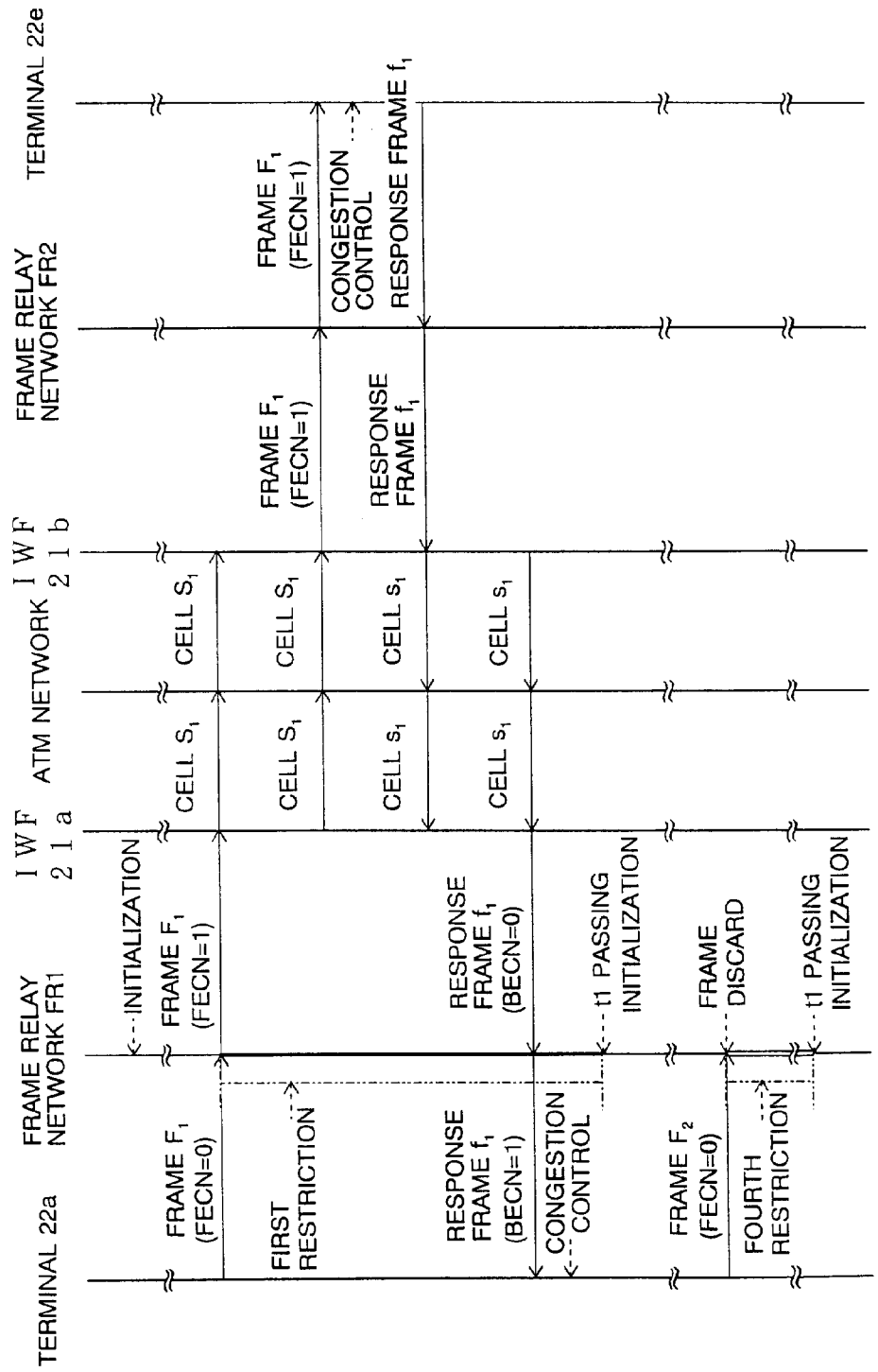
FIG. 15 is a sequence diagram illustrating a n operational sample of the network system shown in FIG. 1.
Figure 16:
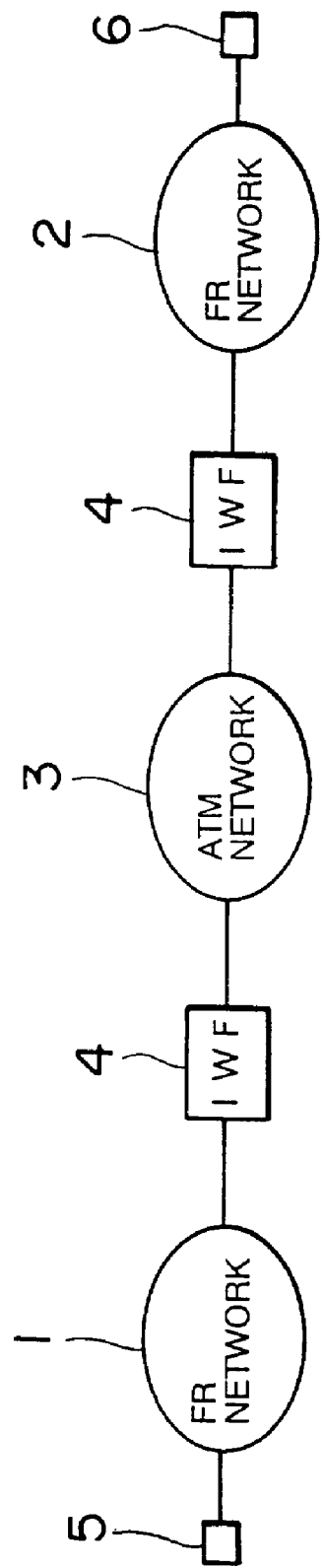
FIG. 16 is a whole structural view of the network system shown in FIG. 1.

Next, an explanation will be given of an operational sample in this network system with reference to FIG. 15. FIG. 15 is a sequence diagram illustrating an operational sample in a case that a frame F is transmitted and received between the terminal 22a and the terminal 22e.

Referring to FIG. 15, first, in each frame relay switch 31a, 31b, 31g in the frame relay network FR1, it is assumed that the transmission data initializing part 58 initializes the content in the transmission data cumulative table 52, which the content is stored correspondingly to the network number of the frame relay network FR2.

Then, it is assumed that after transmitting and receiving the frame F between the terminal 22a and the terminal 22e, a frame $F_1$ which is transmitted from the terminal 22a to the terminal 22e to be a transmitted terminal is transmitted to the frame relay network FR1 (frame relay switch 31a).

The frame $F_1$, as shown in FIG. 2, is transmitted to the frame relay switch 31a through the DLCIa. At that time, "0" to be an initialized value is set in the FECN of the core header 27 in the frame $F_1$.

In the frame relay switch 31a, when the frame $F_1$ is received, the usual process is performed in the step S14 (see FIG. 11), and then the frame $F_1$ is transmitted to the frame relay switch 31g through the DLCIa based on the DLCI number stored in the core header 27 thereof.

In the frame relay switch 31g, it is determined that the frame $F_1$ should be transmitted to the IWF 21a in the step S04. Then, the restrictive class is read in the step S08, and the restrictive level is calculated in the step S09 (see FIG. 11). At that time, for example, when the first restriction is memorized as the restrictive level (step S108: see FIG. 12), the process task (2) is performed so as to set "1" in the FECN of the core header 27 in the frame $F_1$ (step S204: see FIG. 13). Then, the usual process is performed in the step S14, whereby the frame $F_1$ is transmitted to the IWF 21a through the DLCIa.

In the IWF 21a, the frame $F_1$ is disassembled into plural cells $S_1$, and each cell $S_1$ is transmitted to the ATM network 20 via the $VCCx_1$.

In the ATM network 20, a transmitted destination of each cell $S_1$ is determined based on the VCI and the VPI (see FIG. 3) stored in the cell header 70 thereof, and then each cell $S_1$ is transmitted to the IWF 22b via the VCCy.

In the IWF 21b, the plural cells $S_1$ respectively received from the ATM network 20 are assembled into one frame $F_1$. Then, the assembled frame $F_1$ is transmitted to the frame relay network FR2 (frame relay switch 31h) through the DLCIe based on the DLCI number stored in the core header 27 thereof.

In the frame relay switch 31h, it is determined that the frame $F_1$ is received from the IWF 22b in the step S02, and then the frame reception process is performed in the step S03. Incidentally, at that time, it is assumed that the non-restriction is memorized as the restrictive level in the step S305 (see FIG. 14) and the process task (1) is performed. With this arrangement, no traffic restriction is performed, and the usual process is performed in the step S14, whereby the frame $F_1$ is transmitted to the frame relay switch 31c.

In the frame relay switch 31c, the usual process is performed in the step S14 after the steps S01–S04, and the frame $F_1$ is transmitted to the terminal 22e through the DLCIe based on the DLCI number stored in the core header 27 thereof.

When the terminal 22e receives the frame $F_1$, the terminal 22e recognizes that a congestion occurs in the frame relay network FR1 or FR2 based on that "1" is set in the FECN of the frame $F_1$ thereof, and then performs the congestion avoiding procedure (congestion control) so as to control the transmission of the frame F. With this arrangement, the number of frames F transmitted from the frame relay network FR2 to the IWF 21b decreases. The number of cells S transmitted from the IWF 22b to the ATM network 20 also decreases as the number of frames F decreases. Thus, it is prevented that the number of cells S in the VCCy exceeds the PCR.

Thereafter, the terminal 22e generates a response frame $f_1$ to the frame $F_1$, and then transmits the response frame $f_1$ to the frame relay network FR2 (frame relay switch 31c) in regarding the terminal 22a as a transmitted destination.

In the frame relay switch 31c, when the response frame $f_1$ is received, the usual process is performed in the step S14 (see FIG. 11). With this arrangement, the response frame $f_1$ is transmitted to the frame relay switch 31h based on the DLCI number stored in the core header 27 thereof.

In the frame relay switch 31h, when the response frame $f_1$ is received and is determined to be transmitted to the IWF 21b, the traffic restrictive level is calculated in the step S09. Incidentally, it is assumed that the non-restriction is memorized in the step S106 (see FIG. 12) and the process task (1) is performed in the step S202 (see FIG. 13). Then, the usual process is performed in the step S14, and the response frame $f_1$ is transmitted to the IWF 22b through the DLCIe.

In the IWF 21b, the response frame $f_1$ is disassembled into plural cells $s_1$, and then the plural cells $s_1$ are transmitted to the ATM network 20 through the VCCy.

In the ATM network 20, each cell s, is transmitted to the IWF 21a through the $VCCx_1$ based on the VPI and the VCI stored in the cell header 70.

In the IWF 21a, plural cells $s_1$ are assembled to one response frame $f_1$. Then, the response frame $f_1$ is transmitted to the frame relay network FR1 (frame relay switch 31g) through the DLCIa based on the DLCI number stored in the core header 27 thereof.

In the frame relay switch 31g, when it is determined that the response frame $f_1$ is received from the IWF 21a, the frame reception process is performed in the step S03. That is, as shown in FIG. 14, the first restriction is memorized as the restrictive level in the step S305, and "1" is set in the BECN of the core header 27 in the step S310. Then, the usual process is performed in the step S14, the response frame $f_1$ is transmitted to the frame relay switch 31a.

In the frame relay switch 31a, the usual process is performed in the step S14, and the response frame $f_1$ is transmitted to the terminal 22a.

In the terminal 22a, it is recognized that a congestion occurs in the frame relay network FR1 or FR2 based on that "1" is set in the BECN of the frame $F_1$ thereof, and then performs the congestion avoiding procedure (congestion control) so as to control the transmission of the frame F. With this arrangement, the transmission of frames F transmitted from the terminal 22a to the terminal 22e as a transmitted terminal is controlled. Thus, the number of cells S transmitted from the IWF 21a through the $VCCx_1$ decreases, and then it is prevented that the number of cells S exceeds the PCR.

Thereafter, when the measuring time t1 (stored in the restrictive threshold management table 51 correspondingly to the network number of the frame relay network FR2) passes, the network number of the frame relay network FR2 (transmitted frame relay network number) is inputted into the transmission data initializing part 58 (see FIG. 5). With this arrangement, the transmission data initializing part 58 starts, whereby the value SD2 which is stored in the transmission data cumulative table 52 (see FIG. 8) correspondingly to the network number of the frame relay network FR2 is made zero-clear and the non-restriction is set as the traffic restrictive level. The initialization is performed like this.

Thereafter, it is assumed that after receiving and transmitting a frame F not shown between the terminal 22a and the terminal 22e, the terminal 22a transmits a frame $F_2$ which regards the terminal 22e as a transmitted terminal to the frame relay network FR1.

The frame $F_2$ is received by the frame relay switch 31g through the frame relay switch 31a in the frame relay network FR1. Then, the traffic restrictive level is calculated in the step S09 as above mentioned. Here, the process is advanced to the step S113 and the fourth restriction is memorized as the restrictive level. When a discard is notified in the step S212, the frame $F_2$ is discarded in the step S13.

When the measuring time t1 passes again, the transmission data initializing part 58 starts. The transmission data initializing part 58 initializes the value SD2 and the traffic restrictive level stored in the transmission data cumulative table 52 correspondingly to the network number of the frame relay network FR2. With this arrangement, the traffic restriction corresponding to the DLCIa becomes the non-restriction from the fourth restriction.

According to this embodiment, when a frame F is transmitted from one of the frame relay networks FR1–FR3 to one of the IWFs 21a–21c, or when a frame F (response frame) is received from one of the IWFs 21a–21c to one of the frame relay networks FR1–FR3, a traffic restrictive class is detected and a traffic restrictive level corresponding to the transmission data quantity (SD) is calculated, and then a process task corresponding to the restrictive class and the restrictive level is performed. The process task is performed, whereby a congestion avoiding procedure (congestion control) for the frame relay network FR1–FR3 is performed in a transmitting terminal and a transmitted terminal of the frame F. Moreover, according to the restrictive level, a frame F is discarded in one of the frame relay networks FR1–FR3. Thus, there is no case that the number of cells S transmitted to the ATM network 20 exceeds a determined PCR.

Thus, it can be prevented that a cell S (frame F) is discarded in the ATM network 20. According to this, it is possible to avoid a congestion caused by that the number of cells S exceeds the PCR in the frame relay network FR1–FR3. Further, since the re-transmission of the frame in the terminal 22a–22h can be reduced, it is possible to lighten the process load in the frame relay network FR1–FR3 and it is possible to avoid a response deterioration of the communication from a terminal to a terminal (end to end).

Additionally, a restrictive class can be set in accordance with the importance of the DLCIa–DLCIh, and a traffic restrictive process can be performed in accordance with each restrictive class, therefore, it is possible to discriminate each DLCI and to perform a traffic process more suitably.

In this embodiment, as shown in FIG. 2, data links (DLCI) between frame relay networks and IWFs and a VCC between the IWF and the ATM network are set in the ratio of N:1, however, a data link and a VCC may be set in the ratio of 1:1.

Each frame relay switch 31a–31i in this embodiment, when "1" is set in the BECN of the frame by performing a process task, may generate a CLLM (Consolidated Link Layer Management) massage for notifying a congestion occurrence to a transmitting terminal of the frame and may transmit it to the transmitting terminal, and each frame relay switch may transmit a CLLM massage to a transmitting terminal instead of setting "1" in the BECN.

In this embodiment, a restrictive class and a restrictive level are detected every transmitted frame relay network and a process task (1)–(5) is performed, however, a restrictive class and a restrictive level may be obtained every transmitting frame relay network and a process task corresponding to those may be performed. That is, one of the terminals 22e–22h in FIG. 1 may be directly connected to the IWFs 21b, 21c not through the frame relay networks FR2, FR3.

Moreover, the frame relay networks FR1–FR3 are respectively provided with the plural frame relay switches 31a–31i, however, the frame relay networks FR1–FR3 may be provided with one frame relay switch, namely, it is not necessary to care the number of frame relay switches in a frame relay network.

Further, it is possible to vary the measuring time t1. For example, the above-mentioned traffic process may be performed at a real time.

According to a traffic control method, a network system and a frame relay switch of the present invention, it can be prevented that the number of cells transmitted to an ATM network exceeds a maximum transmission rate. Thus, it can be prevented that cells are discarded caused by that the number of cells exceeds the maximum transmission rate and a congestion occurs in frame relay networks.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A frame relay switch in plural frame relay networks in a network system comprising an ATM (Asynchronous Transfer Mode) network, said plural frame relay networks respectively connected to the ATM network through channels and provided with plural frame relay switch, and plural terminals respectively connected to the plural frame relay networks through channels, said frame relay switch comprising:

data quantity measurement means for measuring a data quantity transmitted through each channel;

restrictive level operation means for operating a traffic restrictive level corresponding to the data quantity measured by said data quantity measurement means;

restrictive process storage means for storing a traffic restrictive process corresponding to the traffic restrictive level operated by said restrictive level operation means;

traffic control means for reading the traffic restrictive process corresponding to the traffic restrictive level operated by said restrictive level operation means and performing the traffic restrictive process read from said restrictive process storage means;

restrictive class storage means for storing a traffic restrictive class set for each channel transmitting data from the plural frame relay network to the ATM network, wherein said traffic control means read the traffic restrictive class from said restrictive class storage means, detect the traffic restrictive process stored correspondingly to the traffic restrictive class read from said restrictive process storage means and the traffic restrictive level operated by said restrictive level operation means, and performs the traffic restrictive process which is detected.

2. A frame relay switch according to the claim 1, wherein said data quantity measurement means measures the data quantity transmitted from each of the plural frame relay networks to the ATM network.

3. A frame relay switch according to the claim 1, wherein said traffic restrictive process comprises a process for writing information indicating that a congestion occurs into data transmitted through the each channel.

4. A frame relay switch according to the claim 1, wherein said traffic restrictive process comprises a process for discarding data transmitted through the each channel.

5. A frame relay switch according to the claim 1, wherein said traffic restrictive process comprises a process for transmitting information indicating that a congestion occurs to a transmitting terminal of data transmitted through the each channel.

6. A frame relay switch according to the claim 1, wherein said traffic restrictive process is based on a maximum transmission rate set for the each channel.

7. A network system according to claim 1, wherein at least one of the plural terminals is connected to the ATM network through no frame relay network.

* * * * *